United States Patent
Pötters et al.

(10) Patent No.: US 9,803,680 B2
(45) Date of Patent: Oct. 31, 2017

(54) RELEASABLE VACUUM HOLDING DEVICE

(71) Applicant: Katja Pötters, Rosengarten (DE)

(72) Inventors: Gert Pötters, Rosengarten (DE);
Patrick Schmidt, Seevetal (DE)

( * ) Notice: Subject to any disclaimer, the term of this patent is extended or adjusted under 35 U.S.C. 154(b) by 13 days.

(21) Appl. No.: 14/765,436

(22) PCT Filed: Feb. 4, 2014

(86) PCT No.: PCT/DE2014/000039
§ 371 (c)(1),
(2) Date: Aug. 3, 2015

(87) PCT Pub. No.: WO2014/117766
PCT Pub. Date: Aug. 7, 2014

(65) Prior Publication Data
US 2015/0377280 A1    Dec. 31, 2015

(30) Foreign Application Priority Data

Feb. 4, 2013    (DE) .................. 10 2013 101 100

(51) Int. Cl.
*F16M 13/02*    (2006.01)
*F16B 47/00*    (2006.01)
*A47G 1/17*    (2006.01)

(52) U.S. Cl.
CPC ............. *F16B 47/00* (2013.01); *A47G 1/17* (2013.01); *F16M 13/02* (2013.01)

(58) Field of Classification Search
CPC ............ F16B 47/00; A47G 1/17; F16M 13/02
(Continued)

(56) References Cited

U.S. PATENT DOCUMENTS 2,940,713 A * 6/1960 Van Dusen ............ F16B 47/00
                                                            248/205.1
6,045,111 A    4/2000 Hsieh
(Continued)

FOREIGN PATENT DOCUMENTS

CN    1375043 A    10/2002
CN    201155522    11/2008
(Continued)

OTHER PUBLICATIONS

PCT Notification of Transmittal of Translation of the International Preliminary Report on Patentability (Chapter I or Chapter II) dated Aug. 6, 2015.
(Continued)

*Primary Examiner* — Eret McNichols
(74) *Attorney, Agent, or Firm* — Locke Lord LLP; Alan B. Clement; Peter J. Fallon

(57) ABSTRACT

The invention relates to a releasable holding device (1) for attaching objects to a contact surface (8), with a vacuum chamber (7), which is open towards the contact surface (8) and in which, after application to the contact surface (8) by means of a suction device (20) generating a vacuum, a vacuum can be generated, the vacuum drawing the holding device (1) onto the contact surface (8) with the use of an elastic seal (13) which is provided towards the contact surface (8) and, in the event of a vacuum, brings about the adhesive connection to the contact surface (8), wherein the elastic seal (13) consists of at least one encircling seal which is U-shaped in profile and the limbs (15) of which engage over an encircling press-on web (11) of the holding body (2) and the foot surface (14) of which is firmly pressed in order to form the vacuum chamber (7) and the seal between web front edge (11b) and contact surface (8). Suction device and holding device are of two-part design.

16 Claims, 2 Drawing Sheets

(58) Field of Classification Search
USPC .............. 248/537, 205.5, 205.9, 205.8, 363
See application file for complete search history.

(56) References Cited

U.S. PATENT DOCUMENTS

| | | | | |
|---|---|---|---|---|
| 6,663,077 | B2* | 12/2003 | Zou | F16B 47/00 248/205.5 |
| 6,827,344 | B1 | 12/2004 | Ristau | |
| 6,854,412 | B1* | 2/2005 | Courson | B63C 11/52 114/296 |
| 6,932,306 | B2* | 8/2005 | Zou | F16B 47/00 248/205.5 |
| 6,966,530 | B2* | 11/2005 | Hsu | F16B 47/00 248/205.5 |
| 7,124,987 | B2* | 10/2006 | Zschiedrich | F16B 47/00 248/205.9 |
| 7,607,622 | B2* | 10/2009 | Carnevali | F16B 47/00 248/205.5 |
| 7,628,362 | B2* | 12/2009 | Song | F16B 47/003 248/205.5 |
| 7,850,133 | B2* | 12/2010 | Carnevali | F16B 47/00 248/205.5 |
| 9,410,571 | B2* | 8/2016 | Yang | F16B 47/00 |
| 2002/0175250 | A1* | 11/2002 | Lian | F16B 47/00 248/205.5 |
| 2012/0085879 | A1* | 4/2012 | Hao | F16B 47/00 248/363 |
| 2013/0200237 | A1* | 8/2013 | Park | A47G 1/17 248/304 |
| 2014/0027588 | A1* | 1/2014 | Chen | F16B 47/00 248/205.3 |
| 2014/0084118 | A1* | 3/2014 | Tooley | A47K 10/10 248/205.3 |
| 2014/0374553 | A1* | 12/2014 | Park | F16B 47/00 248/205.5 |
| 2015/0240862 | A1* | 8/2015 | Shi | F16B 47/00 248/205.8 |
| 2015/0314457 | A1* | 11/2015 | Moore | B25J 15/0608 414/752.1 |
| 2015/0369276 | A1* | 12/2015 | Balmer | F16M 13/022 248/205.8 |
| 2015/0377280 | A1* | 12/2015 | Potters | A47G 1/17 248/205.9 |
| 2016/0047405 | A1* | 2/2016 | Curley | F16B 7/10 482/139 |
| 2016/0169269 | A1* | 6/2016 | Wang | F16M 13/022 248/206.2 |
| 2016/0201714 | A1* | 7/2016 | Zhang | F16B 47/00 248/206.2 |
| 2016/0215813 | A1* | 7/2016 | Huang | F16B 47/006 |
| 2016/0258473 | A1* | 9/2016 | Koop | F16M 13/022 |

FOREIGN PATENT DOCUMENTS

| | | | |
|---|---|---|---|
| CN | EP 2827009 A4 * | 12/2015 | ............. F16B 47/00 |
| CN | EP 3054178 A1 * | 8/2016 | ............. F16B 47/00 |
| DE | WO 2006076876 A1 * | 7/2006 | ............. F16B 47/00 |
| EP | 1 770 285 A1 | 4/2007 | |
| JP | EP 0775462 B1 * | 5/2001 | ............. A47K 3/003 |
| WO | WO 01/20177 A1 | 3/2001 | |
| WO | WO 2015200309 A2 * | 12/2015 | ............. F16B 47/00 |

OTHER PUBLICATIONS

First Office Action issued from The State Intellectual Property Office of the People's Republic of China dated Aug. 30, 2016 corresponding to Chinese Application No. 201480007317.6 (in English language, 4 pages; and Chinese language, 9 pages).

* cited by examiner

Fig. 3
Fig. 4
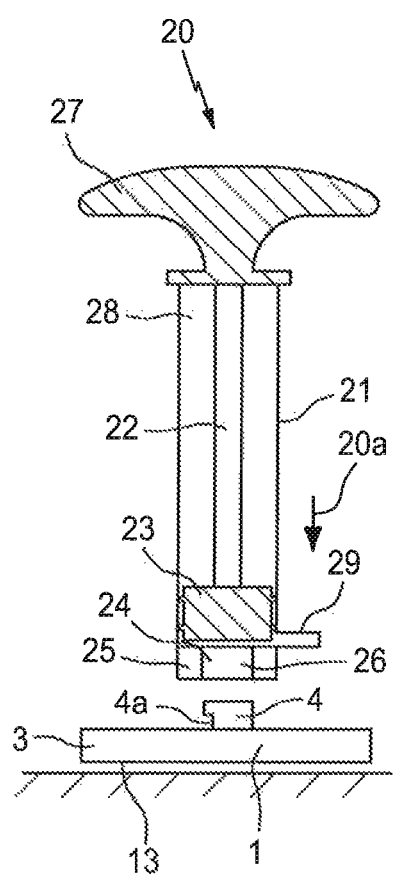
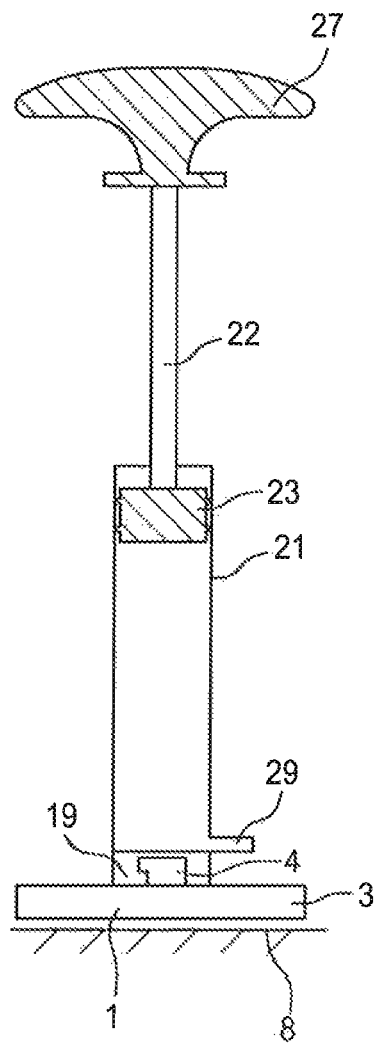
Fig. 5
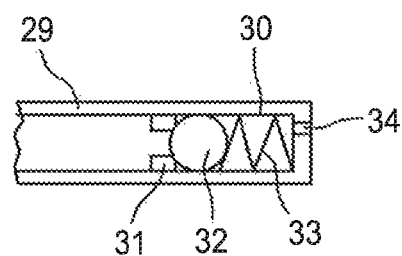

RELEASABLE VACUUM HOLDING DEVICE

CROSS-REFERENCE TO RELATED APPLICATIONS

This application is a U.S. National Stage Filing under 35 U.S.C. 371 from International Patent Application PCT/DE2014/000039, filed Feb. 4, 2014, and published on Aug. 7, 2014 as WO 2014/117766 A2, which claims priority to German Patent Application DE 102013101100.4, filed Feb. 4, 2013.

BACKGROUND OF THE INVENTION (1) Field of the Invention

The invention relates to a releasable vacuum holding device for attaching objects to a contact surface with a vacuum chamber, which is open towards the contact surface and in which, after application to the contact surface by means of a suction device generating a vacuum, a vacuum can be generated.

(2) Description of Related Art

A redetachable holding device operating with a vacuum is known from WO 01/20177 A1. This holding device possesses a holding body that can be airtightly applied to a gas-impermeable contact surface by means of a seal made of elastic material and to which devices for various different carrying functions can be fitted. The holding body features a vacuum chamber open towards the contact surface with an elastic seal towards the contact surface and towards the vacuum chamber a valve, via which a vacuum can be generated by means of a suction device in the vacuum chamber when the holding body is applied to the contact surface. The holding device is capable of securing by means of the carrying functions bathroom accessories for example such as soap dishes or suspension hooks to tiled walls. After opening the valve, the holding device can be removed again.

BRIEF SUMMARY OF THE INVENTION

The purpose of the invention is to create a detachable holding device for application to walls that features an improved seal, which makes for better contact between the holding body and the contact surface, is more gas-tight and also allows application to rough surfaces.

DETAILED DESCRIPTION OF THE INVENTION

The problem at hand is solved according to the invention by the subject of claim 1. Advantageous embodiments are the subject of the subclaims or are described below.

The vacuum holding device for attaching objects to an essentially gas-tight contact surface (8) features:
- a holding body that forms a vacuum chamber, wherein a vacuum can be generated in the vacuum chamber following application to the contact surface and the holding body features a press-on web with a web front edge encircling the vacuum chamber, wherein the web front edge is oriented towards the contact surface (8),
- at least one seal that seals the vacuum chamber towards the exterior in a gas-tight manner against the contact surface.
- at least one opening as the end of a connection between the vacuum chamber and the external environment having at least one valve that ensures gas-tight opening and closing of the connection between the vacuum chamber and the external environment, wherein
- the holding body with the press-on web, during formation of a vacuum in the vacuum chamber, presses on the contact surface by means of the seal provided towards the contact surface,
- the seal features one or several U profiles, wherein two limbs and a foot surface linking the limbs forms a U profile and the limbs at least partially bilaterally encompass the respective press-on web of the holding body and the foot surface spans the at least one web front edge of the press-on web, wherein the at least one web front edge has a sealing effect on the foot surface of the seal under a vacuum in the direction of the contact surface.

The vacuum holding device furthermore preferably features:
- Media for establishing a detachable, essentially gas-tight coupling from the upwards oriented opening with a suction device for generating a vacuum.

Securing the vacuum holding device by means of a device for generating a vacuum on a contact surface comprises the following stages:
- applying the vacuum holding device to the contact surface,
- establishment of a detachable, essentially gas-tight coupling from the outwards oriented opening of the vacuum holding device with a device for generating a vacuum, e.g. a piston suction tube,
- generation of a vacuum in the vacuum chamber, e.g. by withdrawing the suction piston from the piston suction tube until the suction piston passes a top opening and removal of the device for generating a vacuum or pumping using a vacuum pump instead of the piston suction tube.

The detachable holding device features a seal which is U-shaped in profile, the limbs of which engage over the encircling press-on web of the holding body and the foot surface of the seal is applicable to the contact surface for formation of a vacuum chamber.

The contact surface is for example a wall surface. When the holding device rests on the contact surface and vacuum is formed in the vacuum chamber, the seal is achieved in that the front edge of the press-on web, presses under the influence of the vacuum into the foot surface of the seal on to the contact surface. This guarantees by simple means a seal on the contact surface.

According to a further preferred embodiment of the invention, it is provided that the holding body furthermore has towards the periphery a further downwards projecting, encircling, e.g. annular web, known for short as the peripheral web. The peripheral web encircles the press-on web. Preferably, the peripheral web and press-on web are oriented towards the contact surface with a uniform distance, forming a groove, preferably approximately perpendicularly (e.g. 90°+/−10°). The press-on web circulates towards the vacuum chamber and the peripheral web towards the external outline of the holding body where the plate rim (10) is located. The peripheral web conceals the seal at least partially, thereby serving as a visual cover.

According to a further embodiment of the invention, it is provided that the holding body has in addition to the press-on web a further downwards projecting, encircling, e.g. annular web, known for short below as the chamber web. The chamber web encircles the press-on web towards the interior of the chamber. Preferably, the peripheral web and chamber web are oriented towards the contact surface with a uniform distance, forming a groove, preferably approximately perpendicularly (e.g. 90°+/−10°) in relation to the contact surface. The press-on web circulates towards the vacuum chamber and the peripheral web towards the external outline of the holding body.

Between the peripheral web and the press-on web (if present) and the press-on web and the chamber web (if present), an encircling groove is formed in which the limbs of the seal which is U-shaped in profile engage, wherein the foot surface of the seal for formation of the vacuum chamber and the seal between the web front edge of the press-on web and contact surface is firmly pressed. Preferably, the holding body features an encircling peripheral web, an encircling press-on web and an encircling chamber web.

The grooves and webs are preferably designed to be annular (round) or oval.

The press-on web preferably projects over the peripheral web (if present) and the chamber web (if present) in its longitudinal extension in the direction of the contact surface. The webs are preferably aligned in parallel or (uniformly) spaced apart from one another.

The press-on web preferably has a height of 2 to 10 mm respectively, particularly 2 to 6 mm, independently of one another. The grooves are preferably between 1 and 6 mm thick, particularly 1.5 to 4 mm. The foot surface preferably has a material thickness of between 0.5 and 3 mm, particularly between 1.5 and 2.5 mm when uncompressed.

The seal is preferably made of a relatively soft elastic, particularly elastic rubber material and displays in particular a hardness of between 10 and 70 Shore A, particularly between 15 and 30 Shore A and particularly preferably between 15 and 20 Shore A. Suitable materials for the seal include synthetic rubbers and thermoplastic elastomers. The seal is circumferential in design and is preferably designed as a sealing ring.

According to a further embodiment of the invention, provision is made for the presence of two encircling seals which are U-shaped in profile or a seal which is double U-shaped in profile, i.e. W-shaped for instance, the 3 or 4 limbs of which can be pushed into the encircling press-on webs, wherein for example two press-on webs, a peripheral web and a chamber web or for example two press-on webs, a peripheral web and a chamber web in addition to a further web exist between the press-on webs.

The U profile does not necessarily have parallel limbs. The limbs may also run at an angle to the foot surface. The limbs are however preferably aligned approximately parallel to one another (e.g. 180°+/−20°). Irrespective thereof, one or both limbs respectively form an approximate right angle (e.g. 90°+/−10°) in relation to the foot surface and irrespective thereof, the limbs preferably press on to the foot surface at an interval apart from one another.

Two seals may additionally assist in permanently maintaining the vacuum and allow use independently from one another of softer seals or the formation of two separate vacuum chambers that are activated by means of a common valve or two valves.

Preferably, it is provided that the limbs of the seal do not completely fill the groove between at least two webs when the seal is pushed on to the holding body and no contact pressure is exerted on the contact surface. An annular seal can for example, when pushed into the groove, still be pushed to and fro circularly. It is only once a contact pressure on the contact surface arises as a result of the vacuum that compression of the seal causes an increase in width of the seal and the latter fits tightly in the area of its limbs on the side walls of the peripheral and/or chamber web walls and if appropriate also on the side walls of the press-on webs, which are respectively inclined towards the groove.

The holding body of the vacuum holding device preferably consists of plastic, e.g. of an impact-proof plastic, such as ABS (acrylonitrile butadiene styrene) or polyamide and is moreover preferably designed as round or oval towards the contact surface.

The connection between the vacuum chamber and the external environment is preferably designed in the form of a dome, which however features a preferably cone-shaped recess at the top end in the form of an outwards opening (semi-) conical or (semi-)spherical contact surface for receiving the valve.

In order to ensure secure seating, the valve is likewise preferably designed to be conical, semi-conical, spherical or hemispherical in shape corresponding to the contact surface of the dome. The valve functions as a vacuum/sealing valve. The valve is preferably retained in the contact surface with the aid of elastic means, e.g. an elastic band or rod or a spring, which may form a single piece with the valve, if necessary under pretension. It is also possible to hold the valve in place in a valve cage.

According to another embodiment, the valve is designed in the form of a lip-shaped gap, wherein the lips converge convexly to a slot and press together under vacuum. In this case, the dome is preferably designed such as to provide a hold for the end of the elastic means.

The valve may for example be designed such that it initially tapers spherically or conically downwards and in so doing, extends downwards in the manner of a band or rod. At the end of the band or rod, a resistance is located, which may be designed for example in the form of one or several, preferably two, protruding studs, a crossbar, a ball, a cone (etc.) or a wedge.

According to one embodiment of the invention, provision is made for equipping the suction device with a valve, which during a pressure-generating movement of the piston of the suction device, vents an overpressure in the suction tube through compression and decompression via the relief valve. It is therefore possible to create a sufficient vacuum with several suction strokes. This can be performed for example using a reciprocating pump. When the piston is depressed with the holding device attached, a build-up of air occurs in the suction tube. In order to avoid this, any overpressure escapes through the relief valve. According to another embodiment, the sealing ring may also be designed such that like the relief valve, it is capable of releasing overpressure to the outside and the suction device or reciprocating pump does not however need to be removed from the retaining receptacle.

The suction device may also feature only one piston and a piston suction tube, wherein the piston suction tube is attached to the valve seat of the valve body and the bottom end of the piston is withdrawn from the piston suction tube. The valve on the holding body closes owing to the sudden ingress of ambient air through the top opening of the piston suction tube.

The device for generating the vacuum is preferably a manual, e.g. hand-operated, piston suction pump, featuring openings at the beginning and end of the suction travel.

The piston suction pump features a piston drawbar with an integrated tension holding device and furthermore a suction piston preferably manufactured from elastic material such as rubber and creating a seal against the suction tube e.g. with sealing lips. In order also to be able to use the piston suction pump in a vertical position, the bottom opening of the suction tube may also be angularly connected with the detachable coupling.

If necessary, the piston suction pump may also feature a device located centrally at the bottom opening, for example a spike, which prevents the valve from being lifted out of the contact surface by the suction effect of the piston suction pump. The device for generating the vacuum and the vacuum holding device are executed in two parts.

According to a preferred embodiment, the vacuum holding device is applied to the contact surface and the piston suction pump is applied to the coupling surface with a seal located at the bottom opening under slight supportive pressure. By withdrawing the piston rod from the suction tube, the valve is raised slightly out of the pretension and the still remaining atmosphere is to a great extent sucked out of the vacuum chamber. At the moment when the suction piston passes the top opening, which is preferably formed by the tube open upwards in cross-section itself, the cone/ball valve is pressed against its contact surface by the pretention and the now accumulated pressure difference and closes the vacuum chamber against the external pressure. When passing the top opening, it is important according to this embodiment that a large volume of ambient air penetrates into the suction piston at one go, so that the valve of the vacuum holding device closes as quickly as possible as a result of the sudden pressure change.

The vacuum holding device can be easily removed again from the contact surface by opening the valve. The valve can be opened by its being deformed or moved by lateral pressure, e.g. with the finger, whereby a connection between the vacuum chamber and the external environment is established and pressure compensation is induced between the ambient pressure and the vacuum chamber.

The holding device serves to apply utensils such as soap dishes or suspension hooks, preferably to walls of wet rooms, such as bathrooms, toilets or kitchens or on glass or plastic panes. Use is not however restricted to the above. The prerequisite is that substrates that are impermeable to air, such as for example, ceramic, glass, plastic or metal surfaces are available for application.

According to a further preferred embodiment, the internal wall surfaces of the webs facing the seal or sealing ring and/or the seal or sealing ring at the position where the seal or sealing ring faces the webs are designed to be adhesive. According to another embodiment, a further or several further flat sealing ring(s) is/are inserted/introduced respectively between the internal wall surfaces of the webs and the seal or the sealing ring, which respectively feature adhesive surfaces. The adhesiveness is established by a repositionable adhesive compound, particularly an essentially residue-free and permanently removable adhesive compound, as known for example by the name of "pressure-sensitive adhesive". The adhesive compound is for example manufactured from polyurethane or polyacrylates, also foamed if necessary.

The holding device preferably consists of plastic.

The invention will be explained in further detail based on the drawings, without being limited to the latter.

FIG. 1 shows a section through a holding body of a detachable holding device according to the invention with grooves in which the webs of an elastic seal which is U-shaped in profile in the form of a sealing ring can be inserted. The seal is illustrated separately in the form of a section through the U-shaped sealing ring, wherein the limbs of the seal can be pushed into the grooves of the holding body.

FIG. 3 shows a sectional view of a suction device which is in the process of being mounted on a holding device, with a vent valve for venting the suction tube during pressure-generating downwards travel of the suction piston.

FIG. 4 shows a sectional view of a suction device mounted on the holding device, with a vent valve for venting the suction tube during vacuum-generating upwards travel of the suction piston after mounting the suction piston on the holding body.

FIG. 5 shows an enlarged sectional representation of the vent valve.

Figure 1:
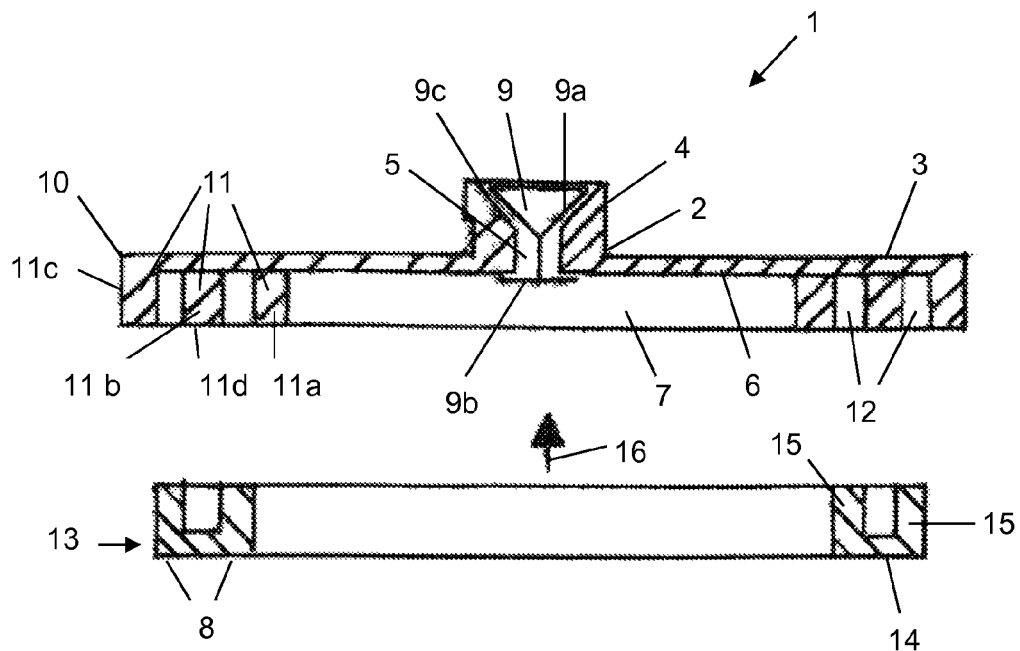

FIG. 1 shows the holding device (1) in section with a holding body (2), with its saucer-shaped base plate (3) and with a dome-like retaining receptacle (4) protruding centrally from the latter. The utensils can be attached to the retaining receptacle (4); the latter is provided with an undercut (4*a*) for this purpose. The retaining receptacle (4) has an air duct (5).

A vacuum chamber (7) forms on the underside (6) of the base plate (3) when the base plate (3) is applied to a smooth wall surface (FIGS. 3 and 4) serving as a contact surface (8). A valve (9) is located in the air duct (5) of the retaining receptacle (4). The valve consists of an elastic material, such as rubber and has a cone (9*a*) in addition to a crossbar (9*b*); the valve (9) is designed such that the cone (9*a*), when air is sucked out of the vacuum chamber (7), lifts from its valve seat (9*c*) and closes down again on the seat (9*c*) when suction is complete. The purpose of the crossbar (9*b*) is to secure the valve (9) in the retaining receptacle (4). At the end of the air duct, an opening is located to which a vacuum device can be connected.

On the underside of the base plate (3) in the simple embodiment of the invention not illustrated in the drawing, only a downwards pointing annular press-on web (11) is provided, on which a sealing ring (13), U-shaped in profile, with its limbs (15) is mounted.

The holding device is subsequently placed against the contact surface (8) with the foot surface (14) of the seal, as a result of which the vacuum chamber (7) results. When the air is sucked out of the vacuum chamber (7), the holding device (1) adheres by suction to the wall surface (8). In so doing, the foot surface (14) of the sealing ring (13) is compressed and pressed down between the web front edge (11*d*) and the wall surface (8). An annual seal is achieved as a result.

In the embodiment of the invention illustrated in FIG. 1, protruding downwards from the underside (6) of the base plate (3) is a peripheral web (11*c*) and surrounded by the peripheral web (11*c*), initially the encircling concentric press-on web (11*b*) followed by the encircling chamber web (11*a*), which form grooved rings (12) between each other.

The sealing ring (13) has a U-shaped profile with a foot surface (14) and two limbs (15). This sealing ring (13) is inserted in the direction of an arrow (16) into the underside (6) of the base plate (3), whereby the limbs (15) are pushed into the grooved rings (12) of the holding body. A contact surface (8) of the seal (13) is thereby formed on the wall surface (8) underneath the foot surface (14). The hollowed out surface in the seal between the limbs may be rectangular, wedge-shaped or of other design, e.g. mushroom-shaped.

When air is now sucked out of the vacuum chamber (7), the holding device (2) adheres by suction to the wall surface (8). The foot surface (14) is compressed by the web front edge (11d) of the contact pressure web. The other webs (chamber web and peripheral web) do not rest on the seal and do not rest on the contact surface in the applied state either.

Figure 2:
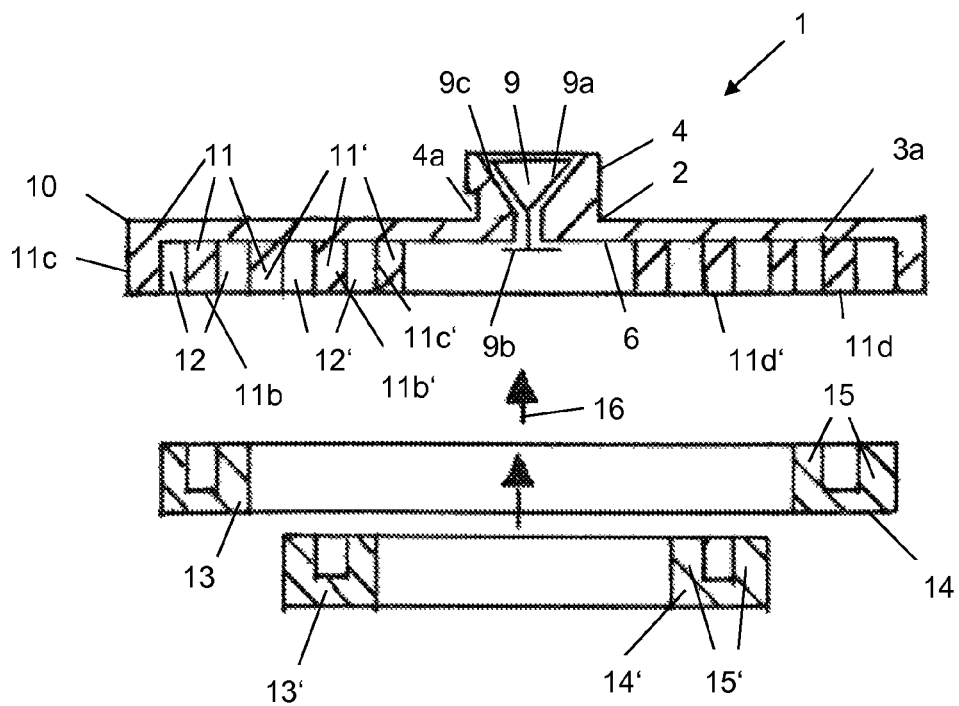
FIG. 2 shows a section through a holding body according to the invention with respectively two encircling grooves in which the limbs of two concentric elastic seals with a U profile can be inserted. Both seals are illustrated separately in the form of a section through two U-shaped sealing rings, wherein the limbs of the seals can be pushed into the grooves of the holding body.

FIG. 3 illustrates a variant of the embodiment according to FIG. 1, with a saucer-shaped base plate (3) and a dome-like retaining receptacle (4). In addition, two further internal concentric web rings (11') towards the centre of the holding body (2) are provided, between which further internal grooved rings (12') are formed. Corresponding to the sealing ring (13) according to FIG. 2, an elastic rubber sealing ring (13) is additionally provided and is pushed into the grooved rings (12). Furthermore, a further internal elastic rubber sealing ring (13') is present, which corresponds in shape to the sealing ring (13).

Both these sealing rings (13 and 13') fitting concentrically into each other are pushed in the direction of the arrow (16) into the underside (6) of the base plate (3), whereby all limbs (15 and 15') of the sealing rings push into the grooved rings (12 and 12') of the holding body. The function is the same as in FIG. 1. The valve (9) in the retaining receptacle (4) also corresponds to that according to FIG. 1.

Provision is made for the limbs (15) of the sealing rings (13, 13') pushed into the grooved rings (12, 12') to be engaged with play in the grooved rings (12, 12') in the unloaded state. When however the holding body (2) is applied to the wall surface (8) and the air is sucked out of the vacuum chamber (7), a compression effect is created in the rubber-like material of the limbs (15) in which the limbs (15) thicken such that they press from the side against the internal side walls of the webs forming the groove.

The top edge of the opening of the air duct (5) and the surrounding circular surface oriented parallel to the contact surface (19) form seal faces for establishing a detachable airtight coupling with a suction tube or a piston suction pump.

FIGS. 3 and 4 show sectional views of the vacuum pump (20) with which the vacuum in the vacuum chamber (7) is generated. The pump (20) has a suction tube (21) in which a piston (23) guided by a plunger (22) can be moved up and down. In both FIGS. 3 and 4, detachable holding devices (1) are located under the suction tube (21), which rest against a wall surface (8). The wall surface (8) only runs horizontally for the sake of a clearer presentation. In practice, the wall surface (8) will preferably run vertically.

In FIG. 3, the vacuum pump (21) is located above the holding device (1) and is being conveyed to the latter. The vacuum pump (20) has at the bottom end (24) of the suction tube (21) a sealing ring (25) with an aperture (26) into which the retaining receptacle (4) of the holding device (1) is suction-fitted. The vacuum pump (20) is applied to the retaining receptacle (4) in the direction of the arrow (20a) in order to generate the vacuum in the vacuum chamber (7). When the piston (23) is drawn up by means of the handle (27), a vacuum is created in the vacuum chamber (7) that causes the holding device (1) to adhere to the wall surface (8). The piston (23) is then finally positioned at the top end (28) of the suction tube (21). If one were now to attempt to depress the piston (23) with the holding device (1) attached, a build-up of air would occur in the suction tube (21). In order to avoid this, a relief valve (29) is provided, illustrated in FIG. 5. This relief valve (29) is mounted at the bottom end (24) of the suction tube (21). It consists of a pipe connecting piece (30) in which a valve seat (31) is located, against which a ball (32) or the like is pressed from outside by means of a compression spring (33). The air is able to escape through a discharge opening (34).

If an overpressure accumulates in the suction tube (21) on depressing the piston (23), this is able to escape through the relief valve (29). This has the further advantage that repressurization can be performed without any need to remove the vacuum pump (20).

According to a variant of the invention not illustrated, no relief valve (29) is provided and the piston does not feature any stop at its top outlet. The piston can therefore be withdrawn from the suction tube (21).

In order to generate a vacuum, the suction tube is applied to the holding device with the piston rod pushed downwards and the piston rod is subsequently withdrawn from the piston tube. The process is repeated if further vacuum is required. The bottom aperture (26) of the suction tube is closed by a seal in the form of a sealing ring (25). The top opening is formed by the suction tube (21), which is open upwards. The suction pump (20) furthermore features a handle (27) and a suction piston (23), which preferably creates a seal against the suction tube with sealing lips. The suction piston is able to pass the top opening.

The valve (9) is raised from its valve seat (9c) in order to detach the holding device from the wall surface. Air thereby enters the vacuum chamber (7) and the holding device (1) detaches itself from the wall surface (8).

The opening with the valve seat can be closed by a cap that—e.g. by inserting a screwdriver head—can be levered out in an outlet or a protrusion in the cap itself or in the surface (12). The cap simultaneously causes the valve to be pushed by the internal surface of the cap cover into the contact surface (8) of the dome creating an additional seal.

The invention claimed is:

1. A vacuum holding device for attaching objects to an essentially gas-tight contact surface, comprising:
    a holding body that forms a vacuum chamber, wherein a vacuum is producible in the vacuum chamber following application to the contact surface, and the holding body comprises a press-on web with a web front edge encircling the vacuum chamber, wherein the web front edge is oriented towards the contact surface,
    at least one seal, that seals the vacuum chamber towards an exterior of the holding device in a gas-tight manner against the contact surface,
    at least one opening between the vacuum chamber and the exterior having at least one valve that ensures gas-tight opening and closing between the vacuum chamber and the exterior,
    wherein
    the holding body with the press-on web, during formation of the vacuum in the vacuum chamber, presses on the contact surface by means of the seal provided towards the contact surface,
    the seal comprises one or several U-profiles, wherein two limbs and a foot surface linking the limbs form an U-profile and the limbs at least partially bilaterally encompass the respective press-on web of the holding body and the foot surface spans the respective web front edge of the press-on web, wherein the web front edge has a sealing effect on the foot surface of the seal under the vacuum in the direction of the contact surface and
    the holding body, in addition to the press-on web comprises a downwards projecting peripheral web, the peripheral web encircles the press-on web and a groove is formed between the press-on web and the peripheral web, in which a limb of the seal engages.

2. The vacuum holding device according to claim 1, wherein the holding body, in addition to the press-on web and the peripheral web furthermore comprises in the direction of the vacuum chamber a downwards projecting chamber web, the chamber web encircles the press-on web towards the inside of the vacuum chamber and a second groove is formed between the press-on web and the chamber web, so that two grooves are formed, one groove between the press-on web and the peripheral web and one grove between the press-on web and the chamber web, in which the limbs of the seal engage.

3. The vacuum holding device according to claim 2, wherein two concentric encircling seals which are U-shaped in profile are provided having limbs, the limbs of which engage in the grooves.

4. The vacuum holding device according to claim 1 or 2, wherein the limbs without contact pressure of the holding body on the contact surface have a play of movement in the groove or grooves and in the presence of contact pressure on the contact surface thicken via a compression effect of the seal such that the limbs only press against the side walls of the peripheral and the press-on webs and on the side walk(s) of chamber web, if present that form the grooves in case of contact pressure, creating an additional seal.

5. The vacuum holding device according to claim 1, wherein the valve is essentially designed as cylindrical, conical, spherical or hemispherical in shape.

6. The vacuum holding device according to claim 1, wherein the connection between the vacuum chamber and the exterior comprises a cylindrical, conical, spherical or hemispherical contact surface for receiving the valve.

7. The vacuum holding device according to claim 1, wherein the valve consists of a valve seat and an elastic rubber material at least in an area(s) that is in contact with the valve seat.

8. The vacuum holding device according to claim 1, wherein the valve comprises a valve seat and extends at one end in the manner of a band or a rod-like outlet with a resistance, particularly in the form of at least one crossbar or wedge, wherein the band or rod-shaped extension of the valve is held tight in the valve seat when vacuum is exerted from outside.

9. The vacuum holding device according to claim 8, wherein the band or rod-like outlet of the valve is elastic, particularly in order to keep the valve seat under elastic pretension.

10. The vacuum holding device according to claim 1, wherein the vacuum holding device comprises a retaining receptacle for the device mounting.

11. The vacuum holding device according to claim 1, wherein at least subareas between the peripheral web and the press-on web and the seal are equipped with a repositionable adhesive compound or the repositionable compound is introduced between the peripheral and the press-on webs and the seal.

12. A two-part set comprising the vacuum holding device according to claim 1 and an intermittently connectable and detachable device, gas-tight with the opening of the vacuum chamber towards the exterior, for generating a vacuum in the vacuum chamber.

13. The set according to claim 12, wherein the device for generating the vacuum is a vacuum pump with a relief valve.

14. The set according to claim 13, wherein the device for generating the vacuum is a piston suction pump.

15. The set according to claim 12, wherein the device for generating the vacuum is a piston suction tube with a suction tube and a suction piston but without a relief valve, wherein the piston suction tube comprises a suction tube opening at one end of the tube that provides a suction path and the suction tube is connectable by an, attachment to the opening of the vacuum chamber towards the exterior in a gas-tight manner and at an end of the suction tube opposite the suction tube opening an opposite end suction tube opening that is passable by the suction piston, so that in when the suction pistons is passing through the opposite end suction tube opening, ambient air is drawn into the suction path.

16. The set according to claim 12, wherein the opening of the vacuum chamber is surrounded towards the exterior by a surface oriented parallel to the contact surface of the vacuum holding device, for applying the device for generating the vacuum by means of a rubber seal.

* * * * *

UNITED STATES PATENT AND TRADEMARK OFFICE
CERTIFICATE OF CORRECTION

PATENT NO. : 9,803,680 B2
APPLICATION NO. : 14/765436
DATED : October 31, 2017
INVENTOR(S) : Gert Pötters et al.

It is certified that error appears in the above-identified patent and that said Letters Patent is hereby corrected as shown below:

In the Claims

In Claim 4, Column 9, Line 21, after "side," delete "walk(s)" and insert -- wall(s) --.

In Claim 15, Column 10, Line 29, after "an" delete ",".

Signed and Sealed this
Twenty-fifth Day of June, 2019

Andrei Iancu
*Director of the United States Patent and Trademark Office*